March 13, 1962     H. J. SHAFER     3,024,809
MODULATING CONTROL FOR HYDRAULIC MOTOR
Filed March 7, 1958
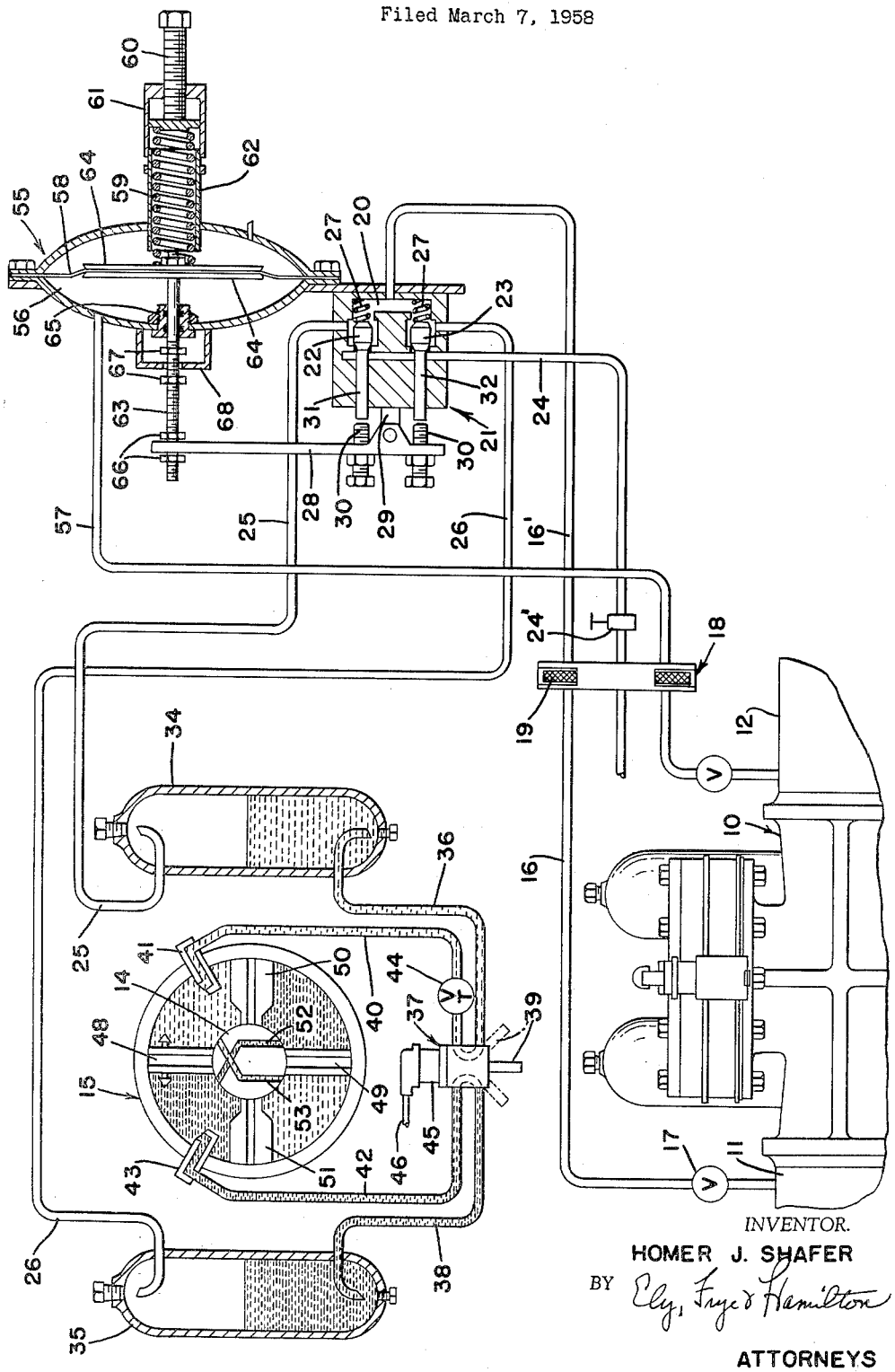
INVENTOR.
HOMER J. SHAFER
BY Ely, Frye & Hamilton
ATTORNEYS

United States Patent Office 3,024,809
Patented Mar. 13, 1962

3,024,809
MODULATING CONTROL FOR
HYDRAULIC MOTOR
Homer J. Shafer, Mansfield, Ohio, assignor to Shafer
Valve Company, Mansfield, Ohio, a corporation of
Ohio
Filed Mar. 7, 1958, Ser. No. 719,830
4 Claims. (Cl. 137—622)

The invention relates generally to a modulating control system for close control of a fluid motor operator in response to changes in conditions, such as temperature, pressure, flow rate, etc. The invention may be applied to modulate the pressure or flow downstream of a pipe line valve by operating the hydraulic motor controlling the valve in response to changes in the downstream pressure. This application is a continuation in part of my copending application Serial No. 673,703, filed July 23, 1957, now abandoned.

In said application Serial No. 673,703, now abandoned, a pilot operated control valve for the hydraulic motor is arranged to apply equal operating pressure to both sides of the motor when the pipe line valve controlled thereby is stabilized in an adjusted position producing the desired downstream pressure in the pipe line, but the pilot is controlled by snap-action valves which are in turn controlled by a second pilot motor sensitive to changes in the downstream pressure.

These snap-action valves are adapted to operate instantaneously to give the control valve pilot a positive full stroke action and cause the control valve to completely close off the operating pressure to one side of the motor and connect it to exhaust. In order to decrease overtravel of the hydraulic motor before the control valve is returned to neutral position by the corrected downstream pressure, the exhaust from the control valve is throttled to retard the adjusting or modulating movement of the motor.

I have discovered that by eliminating the snap action valves and the second pilot controlling the same, and utilizing an extremely sensitive pilot to operate the control valve, the throttling effect upon the control valve due to slight partial stroke movements of the pilot is advantageous in obtaining closer control and less overtravel of the motor, with consequent finer modulation of flow in the conduit controlled thereby.

Accordingly, it is a principal object of the present invention to provide an improved simple and sensitive regulating control for a fluid motor operator in response to changes in operating conditions such as temperature and pressure.

More specifically, it is an object of the present invention to provide an improved control for modulating the flow in a pipe line by operating the hydraulic motor operator for a valve in the line to adjust the flow in response to variations in line pressure.

These and other objects are obtained by the improvements, arrangements and combinations, a preferred embodiment of which is illustrated by way of example in the accompanying drawing and described in detail herein. Various modifications and changes in details of construction are intended to be embodied within the scope of the invention defined in the appended claims.

In the drawing the FIGURE is a schematic view of the improved control applied to regulate the downstream pressure in a pipe line having a rotary valve operated by a rotary vane hydraulic motor powered by pressure from the pipe line.

It will be understood that the invention may be applied to regulate the operation of a fluid motor which operates almost any type of a control device in response to changes of predetermined magnitude in conditions of pressure, temperature, atmosphere and the like, or changes in any conditions which can be converted into pressure impulses or in any way utilized to actuate a control valve for a fluid motor operator.

Referring to the application of the improved control illustrated in the drawing, a pipe line valve is indicated generally at 10, and connects the upstream and downstream sections 11 and 12, respectively, of the pipe line. The valve is preferably a rotary plug or ball valve with its stem keyed to the rotor 14 of a rotary vane motor 15. The pressure fluid for operating rotor 14 may be gas or liquid derived from the upstream side of the pipe line by conduit 16, or it may be derived from another suitable source, if desired.

The power line 16 preferably has a valve 17 therein and is connected to a junction block 18 where the flow is through a strainer 19 and then through a conduit 16' to the pressure chamber 20 of a poppet type control valve 21. The valve 21 is a three-position valve normally connecting the power line to both sides of the operator motor 15, and adapted selectively to connect the power line to one side or the other of the hydraulic motor 15, and to connect the other side of the motor to exhaust.

The control valve 21 has a pair of poppet valves 22 and 23 for connecting the pressure chamber 20 alternately to the exhaust pipe 24 or to one side or the other of the motor 15 by means of conduits 25 and 26, connected to the valve chambers between the pressure chamber 20 and the exhaust passageway, and leading to opposite sides of the motor. The exhaust pipe 24 has a throttle valve therein for a purpose to be described. Springs 27 normally seat the valves to close off the exhaust and connect both conduits 25 and 26 to the pressure chamber, when the control valve is in neutral position as shown. A handle 28 for actuating the poppet valves is pivoted intermediate its ends on an arm 29 projecting from the control valve housing. The handle has studs 30 which engage rods 31 and 32 to actuate the poppet valves when the handle is rocked.

Preferably, the conduits 25 and 26 are connected into the tops of oil tanks 34 and 35, respectively, for operating the motor 15 when the power fluid transmitted from the pipe line is gas, so that the flow to and from the motor can be more easily controlled by suitable orifices or throttling valves to prevent shock loads on the motor. Further, the tanks provide for keeping a closed circuit of oil from the tanks to and from the motor, which allows for expansion and contraction of the oil in the motor due to temperature changes.

A conduit 36 connects the bottom of tank 34 with a multi-way control valve indicated generally at 37, and a conduit 38 connects the bottom of tank 35 with said control valve 37. When the handle 39 of the control valve is in neutral position, as shown in the drawing in full lines, the valve connects conduit 36 with a conduit 40 leading to port 41 on one side of the motor, and connects conduit 38 with a conduit 42 leading to port 43 on the other side of the motor. A throttling valve 44 is provided in one of the lines 40 or 42 (shown in line 40) for regulating the flow of fluid to and from the motor and the speed of rotation of its rotor.

When it is desired to operate the motor 15 manually to turn the rotor in either direction, the valve handle is turned to the right or left as desired, which connects the hand piston pump 45 in circuit with one of the conduits 40 or 42 and the corresponding tank, and simultaneously connects the other of said conduits with the other tank. The construction and operation of a suitable valve 37 and pump 45 is described in detail in my prior Patent No. 2,791,093, issued May 7, 1957, so that the operation of the motor 15 by means of the hand pump will be described only briefly herein.

Thus, if it is desired to operate the rotor 14 manually in a clockwise direction, the valve handle 39 is turned to the left, in which position the valve connects conduits 38 to the suction side of the pump and conduit 42 to the pressure side, while conduit 40 remains connected to conduit 36. On each upstroke of the pump piston, as actuated by handle 46, oil is sucked from tank 35 through conduit 38 and into the pump, and on each downstroke the oil in the pump is forced into the motor through conduit 42 to rotate the rotor 14 clockwise, and exhaust oil through conduits 40 and 36 into the tank 34.

To reverse the direction of rotation of the rotor by the hand pump, the control valve handle 39 is swung to the extreme right position to connect the pump in circuit with the conduits 40 and 36, and to connect conduit 42 with conduit 38, so that the pump will suck oil from tank 34 and force it into the motor, while oil exhausts from the motor through conduits 42 and 38 into tank 35.

Because the flow of oil is always from one tank into the motor, and from the motor into the other tank, regardless of whether the operation is performed by a power fluid or the hand pump, the oil in the motor on opposite sides of the vanes is always in balance and no air gets into the motor.

The conduits 40 and 42 are connected to the motor 15 on opposite sides of the vanes 48 and 49 of the rotor 14. The vanes are adapted to rotate through substantially 90° between diametrically opposite stationary shoes 50 and 51. Variable volume chambers are formed between the vanes and the shoes, and cross-over ports 52 and 53 are provided, preferably in the rotor hub 14, for connecting diametrically opposite chambers to exert equal pressure on both vanes 48 and 49 when turning the rotor in either direction. The edges of the vanes and shoes are provided with suitable sealing means, such as resilient sealing strips of O-ring cross-section, to maintain substantially liquid-tight seals between the shoes and the rotor, and between the vanes and shoes and the casing.

Movement of handle 28 of the control valve 21 in one direction actuates poppet valve 22 which controls fluid flow to and from conduit 25, and movement of the handle 28 in the opposite direction actuates poppet valve 23 which controls fluid flow to and from conduit 26. The handle 28 is automatically actuated in either direction by pressure changes in the downstream section 12 of the pipe line by means sensitive to said pressure changes. Such means may be the diaphragm pilot indicated generally at 55 having one side of the diaphragm chamber 56 connected to section 12 of the pipe line by a conduit 57. If desired, the pressure going to the diaphragm may be proportioned to convert line pressure changes to pressures of proper amplitude, by connecting a conventional differential valve controller in the conduit 57. Such a device can be adjusted to decrease the signal pressure going to the diaphragm in the ratio of 10 to 1, for example.

Movement of the flexible diaphragm 58 in response to pressure in conduit 57 is opposed by a spring 59 abutting the other side of the diaphragm, and the amount of compression of the spring 59 is adjustable by an adjusting bolt 60 mounted in the outer end 61 of a tubular housing 62 for the spring.

A stem 63 is secured at its inner end to plates 64 which abut against opposite sides of the central portion of the diaphragm, in a usual manner. On the side of the diaphragm opposite to the spring 59, the stem extends through a sealing gland 65 in the wall of the diaphragm chamber 56, and the outer end of the stem is connected to the end of handle 28 which extends at right angles thereto. Preferably, the stem 63 extends slidably through the end of the handle and has adjustable stop nuts 66 screwed on the stem to provide some lost motion of the stem before actuating the handle 28. Limiting nuts 67 may be provided on the stem on opposite sides of flanges 68 mounted on the wall of the diaphragm, to limit the movement of the stem after one or the other stop nuts 66 engages the handle. The space between the nuts 67 is adjusted in relation to the travel of the poppet valves 22 and 23 between their seats on the exhaust and pressure side ports, so as to reduce wear on the poppet valves.

In the operation of the improved control, when the downstream pressure in pipe line section 12 is stabilized at the desired control point, the diaphragm 58 is in neutral position and the poppet springs 27 maintain the handle 28 in neutral position as shown in the drawing. In this position the poppets 22 and 23 close off exhaust 24 and connect the pressure chamber 20 through the valve chambers to conduits 25 and 26, so that equal pressure is maintained on both sides of the vanes 48 and 49 of the operator motor.

When a variation in pressure occurs sufficient to cause the diaphragm to actuate the handle 28 in one direction or the other, the corresponding poppet valve is moved away from its exhaust port seat. For example, if a pressure increase occurs which moves the diaphragm 58 and overbalances the spring 59, the poppet valve 22 will be moved away from its exhaust port seat against the action of its spring 27. This movement allows fluid from pressure chamber 20 to escape through the valve chamber into the exhaust conduit 24. As poppet valve 22 moves to an intermediate position between its exhaust port seat and its pressure chamber seat, the flow of fluid past both seats will be throttled by the valve body, and when the flow on the pressure side is throttled to less than the flow on the exhaust side, then the fluid in conduit 25 will start to exhaust out through exhaust conduit 24 and the rotor 14 will begin instantly to rotate clockwise to rotate the valve 10 toward closing.

If only a slight variation in pressure has occurred, requiring only a slight adjustment of the rotor 14, the instant the control point in pressure is reached the poppet valve 22 will move toward its exhaust seat and allow greater flow from the pressure chamber into conduit 25 than from conduit 25 into exhaust conduit 24, with the result that the pressure on both sides of the rotor vanes immediately becomes equal and stops the rotor as the poppet valve 22 shuts off the exhaust port. Accordingly, very close modulation of the main valve 10 is accomplished by this throttling action of the poppet valves in contradistinction to a system utilizing snap-action valves to cause a full stroke action of the poppet valves from fully closed to fully open position, and vice versa, resulting in unavoidable overtravel of the fluid motor operator. Moreover, in adjusting the rotor of the operator in either direction the throttling action of the poppet valves develops only the amount of torque required to turn the rotor, whereas a full stroke action develops full torque on the vane, and utilizes more operating power.

The use of a valve 24' in exhaust conduit 24 provides an adjustable orifice or throttled exhaust, which enables still closer control of the adjustment of the rotor to obtain close modulation of the flow to a desired control point without material overtravel of the rotor, because the exhaust is throttled in two places to slow the movement of the rotor, and the movement of the poppet valves thus does not require as close control to maintain the control point within very narrow limits.

As compared with the system shown in my copending application Serial No. 599,823, filed July 24, 1956, now abandoned, in which the poppet valves of the control normally close off the pressure chamber from both conduits leading to the fluid motor operator and connect both conduits to exhaust, the close control of the operator motor by substantial elimination of overtravel due to the present invention offers still greater advantages. In the system of said application Serial No. 599,823, now abandoned, when one of the poppet valves is actuated from closed to open position, pressure is connected to one side of the operator motor, while the other side remains connected to exhaust, thus turning the rotor to correct the line pressure. When the control point in the line pressure is reached and the poppet valve is closed, the rotor continues to turn until the pressure side conduit is vented to exhaust and pressure is equalized on both sides of the rotor vanes. During this venting to exhaust the flow decreases as the pressure decreases, producing a time lag and overtravel of the rotor.

Overtravel in the operator motor causes over adjustment of the pressure in the line past the control point, reversing the control valve and the rotor, and overtravel to a lesser extent occurs in the opposite direction. This results in "hunting" in the operator motor before the control point is reached. As a result, practically all conventional modulating controls for fluid flow systems have required mechanical braking devices known as "back feed" devices, in an attempt to compensate for overtravel.

In the present invention, when the control point in line pressure is reached and the poppet valve shuts off the exhaust connection, and opens the pressure chamber to the exhaust side of the rotor, the pressure on both sides of the motor is equalized substantially instantaneously with no material overtravel due to a time lag. Accordingly, the control of the present invention makes efficient use of available power to obtain substantially instantaneous close modulating control of the operator motor without the necessity of any back feed device.

Obviously, the improved control system may be utilized as a modulating control for fluid motor operators for various types of control devices, operating in response to changes of predetermined magnitude in a variety of changing conditions.

What is claimed is:

1. In a control system for a fluid motor operator controlling variable conditions and having conduits for supplying and exhausting power fluid to and from opposite sides of the motor, a control valve having a pressure chamber constantly supplied with power fluid and an exhaust passageway, a pair of valve chambers connecting said pressure chamber and said passageway and having ports adapted for connection to said motor operator conduits, and a pair of fluid pressure actuated valve elements independently movable in said valve chambers for selectively gradually closing off said pressure chamber and said exhaust passageway and for throttling flow in both directions in intermediate positions of the valve elements, said valve elements normally closing off said exhaust passageway and opening said pressure chamber to said ports.

2. In a control system for a fluid motor operator controlling variable conditions and having conduits for supplying and exhausting power fluid to and from opposite sides of the motor, a control valve having a pressure chamber constantly supplied with power fluid and an exhaust passageway, a pair of valve chambers connecting said pressure chamber and said passageway and having ports adapted for connection to said motor operator conduits, a pair of fluid pressure actuated valve elements independently movable in said valve chambers for selectively gradually closing off said pressure chamber and said exhaust passageway and for throttling flow in both directions in intermediate positions of the valve elements, said valve elements normally closing off said exhaust passageway and opening said pressure chamber to said ports, and adjustable orifice means connected to said exhaust passageway.

3. In a control system for a fluid motor operator controlling variable conditions and having conduits for supplying and exhausting power fluid to and from opposite sides of the motor, a control valve having a pressure chamber constantly supplied with power fluid and an exhaust passageway, a pair of valve chambers connecting said pressure chamber and said passageway and having ports adapted for connection to said motor operator conduits, and a pair of fluid pressure actuated poppet valves independently movable in said valve chambers for selectively gradually closing off said pressure chamber and said exhaust passageway, said poppet valves normally in exhaust closing position, and said poppet valves adapted in intermediate positions to throttle flow both to said ports and to said exhaust passageway.

4. In a control system for a fluid motor operator controlling variable conditions and having conduits for supplying and exhausting power fluid to and from opposite sides of the motor, a control valve having a pressure chamber constantly supplied with power fluid and an exhaust passageway, a pair of valve chambers connecting said pressure chamber and said passageway and having ports adapted for connection to said motor operator conduits, a pair of fluid pressure actuated poppet valves independently movable in said valve chambers for selectively gradually closing off said pressure chamber and said exhaust passageway, said poppet valves normally in exhaust closing position, and said poppet valves adapted in intermediate positions to throttle flow both to said ports and to said exhaust passageway, and adjustable orifice means connected to said exhaust passageway.

References Cited in the file of this patent

UNITED STATES PATENTS

| | | |
|---|---|---|
| 1,524,497 | Astrom et al. | Jan. 27, 1925 |
| 1,987,505 | Edler | Jan. 8, 1935 |
| 1,992,048 | Temple | Feb. 19, 1935 |
| 2,390,425 | Crum | Dec. 4, 1945 |
| 2,432,502 | Bentley et al. | Dec. 16, 1947 |
| 2,738,945 | Shafer | Mar. 30, 1956 |
| 2,765,808 | Tydeman | Oct. 9, 1956 |
| 2,780,432 | Shafer | Feb. 7, 1957 |
| 2,836,192 | Shafer | May 27, 1958 |